(12) United States Patent
Perache et al.

(10) Patent No.: US 10,655,387 B2
(45) Date of Patent: May 19, 2020

(54) RANGE OF MOTORIZED-DRIVE DEVICES FOR SCREENING BLINDS

(71) Applicant: SOMFY SAS, Cluses (FR)

(72) Inventors: Jean-Michel Perache, Taninges (FR); Eric Lagarde, Sallanches (FR)

(73) Assignee: SOMFY SAS, Cluses (FR)

(*) Notice: Subject to any disclaimer, the term of this patent is extended or adjusted under 35 U.S.C. 154(b) by 411 days.

(21) Appl. No.: 15/520,368

(22) PCT Filed: Oct. 16, 2015

(86) PCT No.: PCT/EP2015/074015
§ 371 (c)(1),
(2) Date: Apr. 19, 2017

(87) PCT Pub. No.: WO2016/062633
PCT Pub. Date: Apr. 28, 2016

(65) Prior Publication Data
US 2017/0306697 A1     Oct. 26, 2017

(30) Foreign Application Priority Data

Oct. 20, 2014  (FR) ..................... 14 02357

(51) Int. Cl.
*E06B 9/72*  (2006.01)
*E06B 9/68*  (2006.01)
(Continued)

(52) U.S. Cl.
CPC .................. *E06B 9/72* (2013.01); *E06B 9/68* (2013.01); *E06B 2009/2447* (2013.01);
(Continued)

(58) Field of Classification Search
CPC .. E06B 9/68; E06B 9/6809; E06B 2009/6881; E06B 9/70; F16H 59/00; F16H 61/00; F16H 57/00; F16H 53/00
See application file for complete search history.

(56) References Cited

U.S. PATENT DOCUMENTS 1,733,002 A * 10/1929 Gibbs ..................... F16H 61/00
                                                    74/336 R
4,997,022 A *  3/1991 Klein ........................ E06B 9/62
                                                    160/265
(Continued)

FOREIGN PATENT DOCUMENTS

AU    2012244079 B2    10/2012
CN       2642976 Y      9/2004
(Continued)

OTHER PUBLICATIONS

International Search Report and Written Opinion dated Dec. 17, 2015 in corresponding International Application No. PCT/EP2015/074015.
(Continued)

*Primary Examiner* — Phi D A
(74) *Attorney, Agent, or Firm* — Joseph V. Saphia; Haug Partners LLP

(57) ABSTRACT

A range of motorized-drive devices (100, 200, 300) for screening blinds comprises: at least one first drive device (100) for driving a first screening blind, comprising a first support (102), a first shaft (104) rotating about a first axis of revolution (106) with respect to the first support (102), at least a winding drum (108) for winding a drive cord of the first screening blind, rotating as one with the first shaft (104), a first geared motor unit (110) for driving the first shaft (104), housed in the first support (102) and kinematically connected to the first shaft (104), preferably via an overdrive (112), and a first electronic control module (114) fixed (Continued)

remote from the first geared motor unit (110), and at least one second drive device (200) for driving a second screening blind, comprising a second support (202), a winding tube (204) for the second screening blind mounted in the second support (202) so as to rotate about a second axis of revolution (206) with respect to the second support (202), a second geared motor unit (210) for driving the winding tube (204), housed inside the winding tube (204), and a second electronic control module (214) fixed remote from the second geared motor unit (210). The first geared motor unit (110) and the second geared motor unit (210) are identical and define a model of geared motor unit (10) that is common to the motorized-drive devices (110, 210) of the range.

16 Claims, 2 Drawing Sheets

(51) Int. Cl.
*E06B 9/24* (2006.01)
*F16H 57/00* (2012.01)
*F16H 59/00* (2006.01)

(52) U.S. Cl.
CPC ...... *E06B 2009/6809* (2013.01); *F16H 57/00* (2013.01); *F16H 59/00* (2013.01)

(56) References Cited

U.S. PATENT DOCUMENTS

| | | | | |
|---|---|---|---|---|
| 5,040,843 | A * | 8/1991 | Russell | B60J 7/068 |
| | | | | 160/133 |
| 5,129,442 | A * | 7/1992 | Warner | E05D 13/1215 |
| | | | | 160/265 |
| 6,257,305 | B1 * | 7/2001 | Mullet | E06B 9/42 |
| | | | | 160/133 |
| 2004/0216379 | A1 * | 11/2004 | Gioia | E06B 9/68 |
| | | | | 49/29 |
| 2006/0162876 | A1 | 7/2006 | Kwak | |
| 2006/0232233 | A1 | 10/2006 | Adams et al. | |
| 2011/0061818 | A1 * | 3/2011 | Geriniere | E06B 9/322 |
| | | | | 160/168.1 P |
| 2012/0090797 | A1 * | 4/2012 | Mullet | E06B 9/322 |
| | | | | 160/331 |
| 2013/0240165 | A1 | 9/2013 | Chambers et al. | |
| 2014/0166212 | A1 | 6/2014 | Lagarde et al. | |
| 2014/0309894 | A1 * | 10/2014 | Li | F16H 57/12 |
| | | | | 701/51 |
| 2016/0053857 | A1 * | 2/2016 | Park | F16H 1/20 |
| | | | | 399/167 |
| 2018/0178799 | A1 * | 6/2018 | Natori | F16H 61/00 |
| 2018/0355972 | A1 * | 12/2018 | Kim | F16H 61/682 |
| 2019/0154146 | A1 * | 5/2019 | Okahara | F16H 59/70 |
| 2019/0333722 | A1 * | 10/2019 | Hinuma | H01H 11/00 |

FOREIGN PATENT DOCUMENTS

| | | | | |
|---|---|---|---|---|
| CN | 1720384 | A | 1/2006 | |
| CN | 1930360 | A | 3/2007 | |
| CN | 101163847 | A | 4/2008 | |
| CN | 103075092 | A | 5/2013 | |
| CN | 203729849 | U | 7/2014 | |
| EP | 3306137 | A1 * | 4/2018 | ......... F16H 37/0813 |
| FR | 2 978 792 | | 2/2013 | |
| WO | WO-2016147606 | A1 * | 9/2016 | ............... F16H 1/00 |

OTHER PUBLICATIONS

Office Action issued in corresponding Chinese Application No. 201580055944.1 dated Sep. 5, 2018.
Office Action issued in corresponding Chinese Application No. CN201580055944.1 dated May 5, 2019.

* cited by examiner

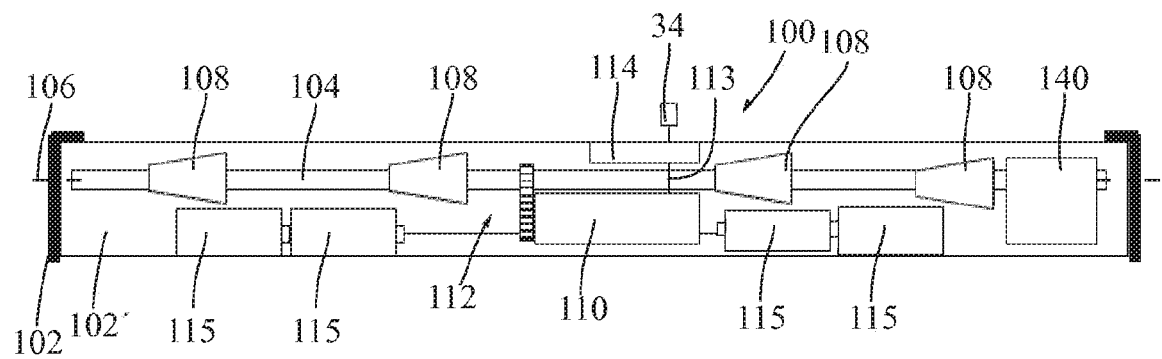
Fig.1
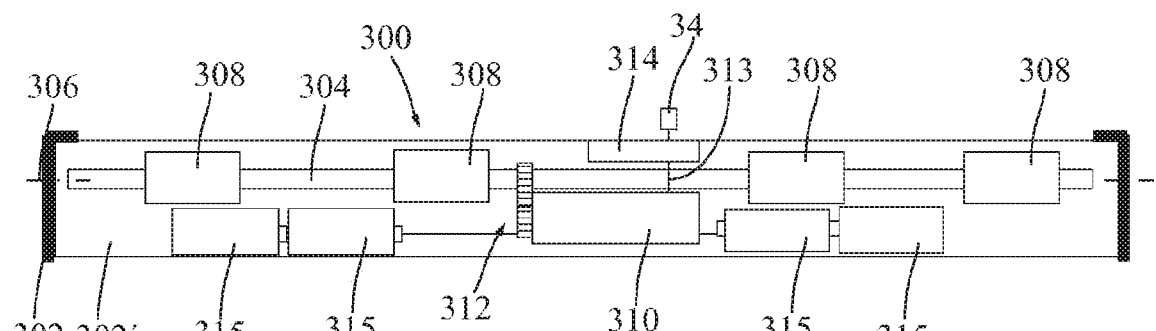
Fig.2
Fig.3

RANGE OF MOTORIZED-DRIVE DEVICES FOR SCREENING BLINDS

CROSS-REFERNCE TO RELATED APPLICATIONS

This application is the National Stage entry under 35 U.S.C. § 371 of International Application No. PCT/EP2015/074015 filed on Oct. 16, 2015, published on Apr. 28, 2016 under Publication No. WO 2016/062633, which claims the benefit of priority under 35 U.S.C. § 119 of French Patent Application No. 1402357 filed on Oct. 20, 2014.

TECHNICAL FIELD OF THE INVENTION

The present invention relates to a range of motorized-drive devices for screening blinds.

BACKGROUND OF THE INVENTION

Different types of motorized-drive devices are known, dedicated to deploying and retracting non-winding screens (pleated blinds, cellular blinds, Roman blinds or Venetian blinds, for example), others dedicated solely to the orientation of blinds with adjustable slats, and still others dedicated to winding windable screens. These devices generally use adjacent, but different technologies, resulting in a lack of streamlining that causes high costs, in particular in terms of the management of the component parts of these driving devices. In particular, the motor means of a drive device dedicated to a given application are considered to be specific, in order to provide a targeted response to speed, torque and noise level requirements as well as the constraints of the application. Efforts have been made to increase the configurability of drive devices, and in particular to allow the delayed differentiation between several available options for driving a given type of screen. To date, however, the existence of multiple types of screens remains an obstacle to in-depth streamlining of the number of drive devices.

BRIEF DESCRIPTION OF THE INVENTION

The invention seeks to resolve the drawbacks of the state of the art and to propose simple means for streamlining motorized-drive devices for screens.

To that end, a first aspect of the invention proposes a range of motorized-drive devices for screening blinds, including:

at least one first drive device for driving a first screening blind, comprising a first support, a first shaft rotating around a first axis of revolution with respect to the first support, at least a winding drum for winding a drive cord of the first screening blind, secured in rotation with the first shaft, a first geared motor unit for driving the first shaft, and a first electronic control module of the first geared motor unit, at least one second drive device for driving a second screening blind, comprising a second support, a winding tube for the second screening blind so as to rotate around a second axis of revolution with respect to the second support, a second geared motor unit for driving the winding tube, fixed to the second support and housed inside the winding tube, and a second electronic control module of the second geared motor.

According to the invention, the first geared motor unit and the second geared motor unit are identical and define a geared motor unit model shared by the motorized-drive devices of the range.

By choosing a geared motor unit model shared by two separate applications, it becomes possible to share a motor pack specific to the range.

According to one embodiment, the first drive device includes a speed reduction or overdrive stage between the first geared motor unit and the driveshaft. Preferably, the speed reduction or overdrive stage of the first driving device is a speed overdrive, which preferably has a speed ratio in a range comprised between 1.1 and 2. By providing a speed overdrive for the first drive device, which is a priori the application requiring the highest rotation speed of the shaft, it is possible to size the speed reducer integrated into the geared motor to a value midway between the needs of the first drive device and the second drive device.

In particular, it is possible to provide that the second geared motor unit drives the winding tube of the second drive device directly. In this scenario, the speed ratio of the reducer integrated into the geared motor is adapted to drive a windable screen directly.

Alternatively, the second drive device includes a speed overdrive or reduction stage between the second geared motor and the winding tube. The speed overdrive or reduction stage of the second drive device makes it possible to produce a broad range from the same geared motor unit. Preferably, the speed overdrive or reduction stage between the second geared motor unit and the winding tube is a speed reducer that preferably has a speed ratio in a range comprised between 1/1.1 and 1/2. In this scenario in particular, it is possible to provide that the first geared motor unit drives the first shaft directly, resulting in additional simplification.

Preferably, the shared geared motor unit model of the range has a cylindrical case. The geared motor unit is thus completely suitable for use to drive a winding drum of a screen. As a result of this choice, adapting pieces, for example flanges, will preferably be used to fasten the cylindrical case to the supports of the first drive device and third drive device.

According to one embodiment, the first drive device includes a compensating spring mounted kinematically between the first shaft and the first support. The compensating spring makes it possible to recover energy during the deployment phase of the screen and retrieve it during the retraction phase. This makes it possible to limit the power of the geared motor unit. For the same reasons, it is possible to provide that the second drive device includes a compensating spring preferably housed in the winding tube and mounted kinematically between the winding tube and the second support.

Preferably, the shared geared motor unit model of the range comprises a rotary encoder and a rotation sensor reading information borne by the encoder.

The range of drive devices previously defined is particularly suitable for so-called autonomous or wireless installations, therefore in particular not powered from the grid. To that end, the first geared motor unit is preferably powered by a first electrochemical source housed in the first support, and the second geared motor unit is powered by a second electrochemical source housed in the second support. If applicable, it is also possible to provide a recharge of the electrochemical sources by an energy generating module, for example based on photovoltaic cells.

According to one particularly advantageous embodiment, the first electronic control module and the second electronic control module are physically identical and define an electronic control module shared by the drive devices in the range. It is also possible to provide for grafting additional modules corresponding to optional specific functions to an electronic control module shared by the entire range.

The control module may optionally be integrated into the geared motor. However, to minimize the bulk of the geared motor, and allow greater flexibility in the positioning of the different shared components of the devices of the range, it is advantageously possible to provide that:

the first electronic control module of the first geared motor unit is fastened to the first support remote from the first geared motor unit and connected to the first geared motor unit by a first flexible electrical connection;

the second electronic control module of the second geared motor unit is fastened to the second support remote from the second geared motor unit and connected to the second geared motor unit by a second flexible electrical connection.

According to one particularly advantageous embodiment, the range further includes at least one third device for driving a third screening blind, including a third support, a third shaft rotating around a third axis of revolution with respect to the third support, at least a winding drum for winding a drive cord of the third screening blind, secured in rotation with the third shaft, a third geared motor unit for driving the third shaft, housed in the third support and kinematically connected to the third shaft by a speed reducer, and a third electronic control module of the third geared motor unit, the third geared motor unit being of the shared geared motor unit model of the range.

The streamlining is then even more in-depth, since one for example covers most of the needs of a range of indoor screens.

If the third drive device is also present, it is in particular possible to provide that the overdrive of the first drive device has a speed ratio and a range comprised between 1.1 and 2; and that the speed reducer of the third drive device has a speed ratio and a range comprised between 1/2 and 1/4.

The control module of the third drive device is preferably of the same model as that of the first and second drive devices of the range. If applicable, the third geared motor is powered by a third electrochemical source housed in the third support.

Naturally, several drive devices similar to the first drive device, several drive devices similar to the second drive device, and if applicable several drive devices similar to the third drive device may exist in the range, and differing from one another by their drum or tube lengths or diameters, the shape of the supports, and the speed ratio of the overdrives or speed reducers, or even the absence or presence of an overdrive or speed reduction stage for the devices similar to the second drive device.

BRIEF DESCRIPTION OF THE FIGURES

Other features and advantages of the invention will emerge from reading the following description, in reference to the appended figures, which illustrate:

FIG. 1 is a schematic view of a first device for driving a first screening blind belonging to a range of motorized-drive devices according to one embodiment of the invention;

FIG. 2 is a schematic view of a second device for driving a second screening blind belonging to the same range of motorized-drive devices as the device according to FIG. 1;

FIG. 3 is a schematic view of a third device for driving a third screening blind belonging to the same range of motorized-drive devices as the device according to FIG. 1;

For greater clarity, identical elements are identified using identical reference signs in all of the figures.

DETAILED DESCRIPTION OF THE INVENTION

Figure 4:
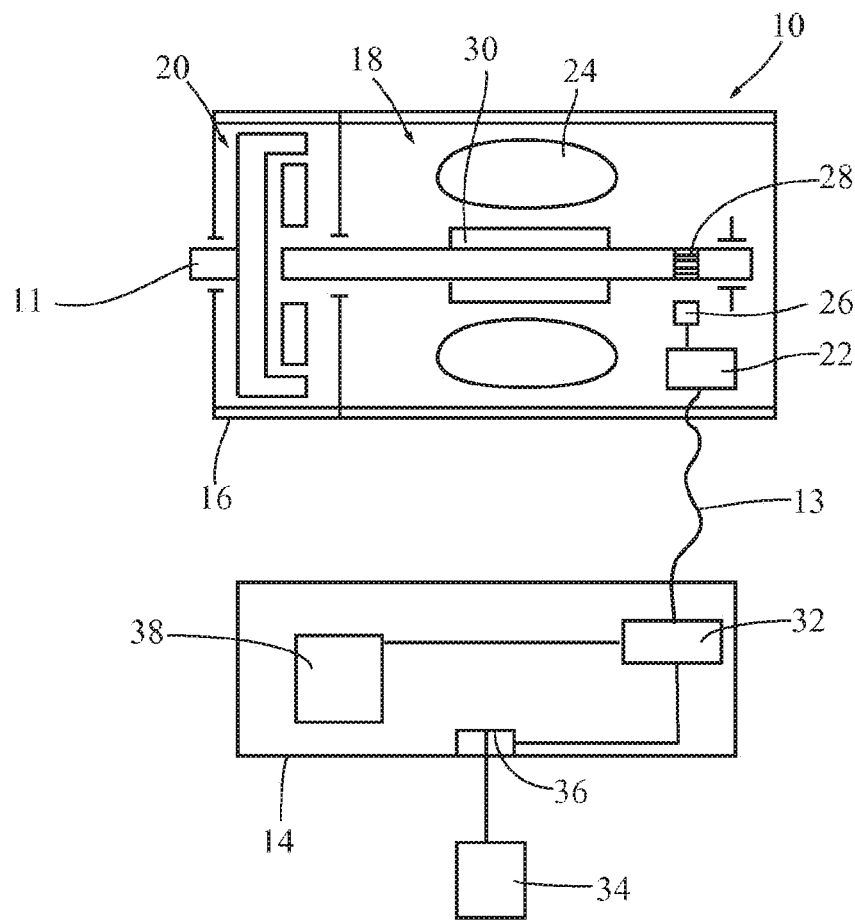
FIG. 4 is a schematic view of a geared motor unit and a control module shared by the first, second and third motorized-drive devices of FIGS. 1 to 3.

FIGS. 1 to 3 illustrate three motorized-drive devices 100, 200, 300, belonging to a same range of motorized-drive devices for different types of screening blinds.

FIG. 1 shows a first drive device 100 of the range, intended more particularly for a first screening blind deployed and retracted using one or several cords, for example a pleated blind, a cellular blind, a Roman blind or a Venetian blind. The first drive device 100 includes a first support 102, for example able to be made up of a rail 102' securing fastening lugs to one another, and if applicable a protective casing (not shown), a first shaft 104 rotating around the first axis of revolution 106 with respect to the first support 102', one or several winding drums 108 for one or several drive cords of the first screening blind, secured in rotation with the first shaft 104, a first geared motor unit 110 for driving the first shaft, housed in the first support 102 and an output shaft of which is kinematically connected to the first shaft 104, to rotate the latter, and a first electronic control module 114 fastened to the support 102 remote from the first geared motor unit 110. An overdrive stage 112 is also provided between the output shaft of the geared motor unit and the driveshaft 104.

FIG. 2 illustrates a second drive device 200 intended more particularly to drive a second screening blind of the windable screen type. This second drive device 200 includes a support 202, a winding tube 204 for the second screening blind mounted in the support 202 so as to rotate around a second axis of revolution 206 with respect to the second support 202, a second geared motor unit 210 for driving the winding tube 204, housed inside the winding tube 204, fixed to the second support and an output shaft of which is kinematically connected to the winding tube 204 by a connecting part 205, and a second electronic control module 214 fixed remoted from the second geared motor unit 210.

FIG. 3 shows a third drive device 300 of the range, intended more particularly for a first steerable blind, in particular a blind with only steerable slats. The third drive device 300 includes a third support 302, a rail 302' fixed to the third support 303, a third shaft 304 rotating around a third axis of revolution 306 with respect to the first support 302 and the rail 302', at least one winding drum 308 for winding a steering cord of the third screening blind, secured in rotation with the third shaft 304, a third geared motor unit 310 for driving the third shaft 304, housed in the rail 302' and an output shaft of which is kinematically connected to the third shaft 304 to rotate the latter via at least one speed reduction stage 312, and a third electronic control module 314 fastened to the third support 302 remote from the third geared motor unit 310.

The motorized-drive devices 100, 200, 300 have shared characteristics, and in particular, an identical geared motor unit model, supplied with direct current by electrochemical power sources 115, 215, 315, and controlled by an off-board control module 114, 214, 314. An identical geared motor unit model here means that the geared motor units 110, 210, 310 are identical.

More specifically, this geared motor unit model shared by the entire range, identified by reference 10 in FIG. 4, is characterized by a cylindrical case 16, containing a motor 18 and a speed reducer 20 with one or several stages. This cylindrical case 16 allows direct integration of the geared motor unit 10 inside the winding tube 204 of the screen of the second motorized-drive device 200. The cylindrical case 16 can be fastened to the support 102, 302 of the first and third motorized-drive devices 100, 300 via adapter pieces, for example flanges. Alternatively, it is possible to fasten the cylindrical case 16 of the geared motor unit 10 to a case of the overdrive stage 112 of the first drive device or the speed reduction stage 312 of the third drive device.

The motor 18 is preferably a direct current brush motor with manifold. The switching of the current in the windings is done mechanically via blades of the manifold. The motor may also be a brushless direct current (BLDC) motor. A motor of this type comprises a rotor provided with permanent magnets 30 and a stator provided with several coils 24. The motor further comprises an electronic steering circuit 22 arranged to successively supply the coils 24 with electricity. In order for the motor to operate, the electromagnetic fields created by the successive power supply of the coils 24 must be synchronized on the position of the rotor. The electronic steering circuit 22 can be positioned, at least partially, in the motor case 16. It in particular comprises at least one optical or magnetic rotation sensor 26, preferably a Hall effect sensor, which can be either associated with an encoder 28 mounted on the driveshaft, or directly sensitive to the magnetic field of the rotor poles 30. The rated speed of the motor can be relatively high, preferably greater than 25 RPM, and preferably greater than 30 RPM, for a relatively low torque, below 0.02 Nm. The geared motor unit is preferably designed to limit the electricity consumption and to emit only a low audio emission. At least part of the electronic circuit 22 can be comprised in the electronic control module associated with each drive device.

The reducer 20 associated with the motor 18 is positioned in the shared cylindrical case 16 of the geared motor unit. The reducer 20 is preferably an epicyclic reducer with one or several stages, having an output shaft 11 making up the output member of the geared motor unit 10.

According to a first embodiment shown in FIGS. 1 to 3, the reducer of the geared motor unit 210 has the torque adaptation necessary for the application to a windable screen without any other transmission stage. In this embodiment, the second geared motor unit 210 directly drives the winding tube 204 of the second drive device 200, via the connecting piece 205 between the output shaft 11 of the geared motor unit 210 and the winding tube 204.

Inasmuch as the torque and speed output by the geared motor unit 10 are optimized to actuate the windable screen, an adaptation proves necessary for the other two devices 100, 300, hence the presence of an overdrive stage 112 for the first device 100 and a speed reduction stage 312 for the third device 300. The following table provides an example of the speed ratios of each stage:

|  |  | Device no. 1 | Device no. 2 | Device no. 3 |
|---|---|---|---|---|
| Geared motor unit | Rated motor torque (Nm) | 0.014 | 0.014 | 0.014 |
|  | Rated motor speed (RPM) | 1500 | 1500 | 1500 |
|  | Speed ratio of the | 1/43 | 1/43 | 1/43 |

|  |  | Device no. 1 | Device no. 2 | Device no. 3 |
|---|---|---|---|---|
| Additional stage | integrated reducer Speed ratio | 1.6 | 1/1 | 1/2.3 |
| Shaft | Rated speed | 55 | 35 | 15 |
|  | Rated torque | 0.4 | 0.6 | 1.4 |

The electronic steering circuit 22 of the motor 10 is connected by a control cable 13, 113, 213, 313 to the off-board electronic control circuit 114, 214, 314, which sends the commands from the electronic control circuit 114, 214, 314 to the electronic steering circuit 22, and in return escalates data necessary for the command, and in particular data supplied by the rotation sensor 26, which may include rotation speed and/or angular position information. The electronic control circuit 114, 214, 314 can be physically identical for all three drive devices, thus constituting a universal control module 14, illustrated in FIG. 4. The programming of the control module can be specific to each motorized-drive device in the range. To that end, the electronic control circuit 14 preferably has a programmable non-volatile memory 32, for example of the EEPROM type. This in particular makes it possible to take account of, or not take account of, steering management means, specific control ergonomics. Depending on the needs of the application, it is also potentially possible to associate one or several sensors 34 with the control module in particular to detect ambient parameters (brightness, wind, etc.) and take account of, or not take account of, these ambient parameters. To that end, the control module 14 preferably includes connecting terminals 36 for such sensors 34. The control module 14 also includes a receiving interface 38 for control signals sent by cable or wirelessly, for example of the infrared or radio frequency type.

In order to be able to offer different levels of functionalities or different communication protocols, it is possible to provide several control modules 14, each module preferably being usable with all three types of drive devices 100, 200, 300, but corresponding to a given communication protocol or functionality level, proposed for the entire range. It is also possible to provide a control module that itself is modular, with a universal part shared by all of the devices 100, 200, 300 in the range, and optional modules, for example telecommunications, measurement or ambient data processing modules, that connect on the universal module.

The control module 14, 114, 214, 314 can be positioned in any appropriate location on the support. It may in particular be positioned near the electrochemical generators 115, 215, 315.

The power supply of the control circuit 14, 114, 214, 314 and the steering circuit 22 that supplies power to the motor 20 is done with direct current, preferably using one or several electrochemical generators 115, 215, 315, which may be cells or rechargeable batteries. Preferably, this or these electrochemical generators 115, 215, 315 are fastened to the support 102, 202, 302 of the drive device 100, 200, 300, preferably housed inside the support. The number and position of the electrochemical generator(s) 115, 215, 315 can vary from one drive device in the range to another. For maximum configurability, there is an interest in providing several modules with electrochemical generators 115, 215, 315, connected in series or in parallel, which in particular makes it possible to best use the available space in or on the support 102, 202, 302 in each application. Alternatively, a motorized-drive device can be powered from the grid, through a rectifier.

The support 102, 202, 302 is specific to each drive device in the range. It may be a box or a simple chassis.

To limit energy consumption, it is advantageously possible to provide a compensating spring 140, 240 for the first drive device 100 and/or the second drive device 200. When the windable screen associated with the second drive device 200, or the pleated screen or the Venetian blind associated with the first drive device 100 are deployed under the effect of their own weight, they contribute to stretching the associated drive spring 240, 140, the energy being stored in the form of elastic potential energy and retrieved when the screen is raised.

Figure 5:
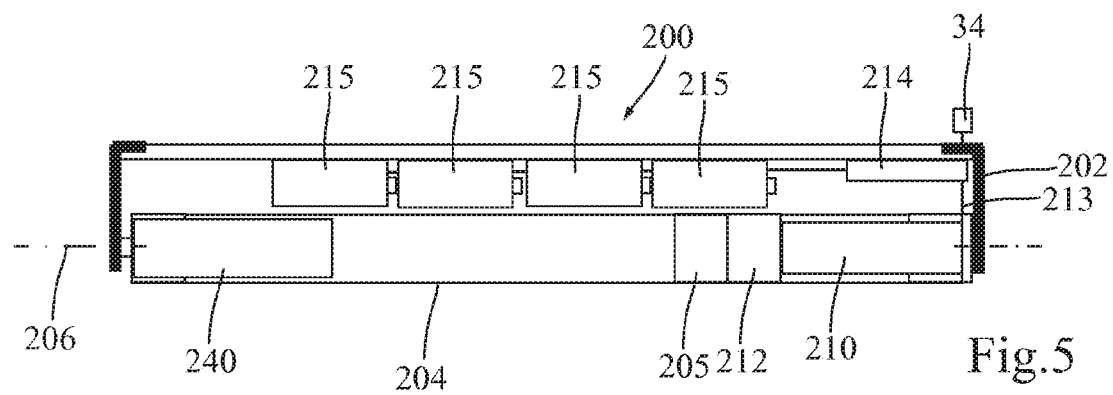
FIG. 5 is an alternative embodiment of the motorized-drive device of FIG. 2.

According to a second embodiment shown in FIG. 5, the reducer 20 associated with the motor 18 is positioned in the shared cylindrical case 16 of the geared motor unit and has the torque adaptation necessary for the application to a windable screen without any other transmission stage. According to this embodiment, the overdrive 112 of the first drive device 100 can be omitted. It is, however, appropriate to provide, as illustrated in FIG. 5, a speed reduction stage 212 between the geared motor unit 210 and the winding tube 204 of the screen of the second drive device 200. This speed reduction stage 212 must fit in the cylindrical envelope of the geared motor unit 210, in the direct extension thereof.

The following table provides an illustration of possible selection ranges for the sizing of the different components of the drive devices 100, 200, 300:

|  |  | Device no. 1 | Device no. 2 | Device no. 3 |
|---|---|---|---|---|
| Geared motor unit | Rated motor torque (Nm) | 0.014 | 0.014 | 0.014 |
|  | Rated motor speed (RPM) | 1500 | 1500 | 1500 |
|  | Speed ratio of the integrated reducer | 1/27.2 | 1/27.2 | 1/27.2 |
| Additional stage | Speed ratio | 1/1 | 1/1.6 | 1/3.6 |
| Shaft | Rated speed | 55 | 35 | 15 |
|  | Rated torque | 0.4 | 0.6 | 1.4 |

According to another alternative embodiment, the reducer 20 associated with the motor 18 and positioned in the shared cylindrical case 16 of the geared motor unit has a torque adaptation intermediate between the needs of the motorized-drive devices of a non-windable screen and of a windable screen. Thus, the drive device 200 of FIG. 5 dedicated to winding a screen provides, between the geared motor unit 210 and the winding tube 204 of the screen of the second drive device 200, an overdrive stage 212, which must fit in the cylindrical envelope of the geared motor unit 210, in the direct extension thereof. The first motorized drive device comprises an overdrive stage 112 between the output shaft 11 of the geared motor unit and the driveshaft 104.

One thus has greater freedom in choosing the motor 18 or geared motor unit 10 model adapted to the operating or sizing constraints of the entire range. Naturally, the sizes above are provided solely as an illustration and non-limitingly. They correspond to a range of motorized-drive devices powered by onboard autonomous electrochemical power supplies, with a low available power. For a range of drive devices powered from the grid, the available power is much higher and leads to different sizing. However, the speed ratios of the additional stages remain relatively close to the ranges previously described, since the sizing of the speed ratio of the additional stage depends on the type of screen being driven more than the available power.

Furthermore, it is possible to integrate the electronic steering circuit into the off-board electronic control module.

The invention claimed is:

1. A range of motorized-drive devices for screening blinds, comprising:
   at least one first drive device for driving a first screening blind, comprising:
      a first support,
      a first shaft rotating around a first axis of revolution with respect to the first support,
      at least a winding drum for winding a drive cord of the first screening blind, secured in rotation with the first shaft,
      a first geared motor unit for driving the first shaft, and
      a first electronic control module of the first geared motor unit,
   at least one second drive device for driving a second screening blind, comprising:
      a second support,
      a winding tube for the second screening blind so as to rotate around a second axis of revolution with respect to the second support,
      a second geared motor unit for driving the winding tube, fixed to the second support and housed inside the winding tube, and
      a second electronic control module of the second geared motor,
   wherein the first geared motor unit and the second geared motor unit are identical and define a geared motor unit model shared by the motorized-drive devices of the range,
   wherein the first motorized drive device comprises a speed reduction or overdrive stage between the first geared motor unit and the first shaft, and
   wherein the second geared motor unit directly drives the winding tube of the second drive device or the second drive device includes a speed overdrive or reduction stage between the second geared motor and the winding tube.

2. The range of motorized-drive devices according to claim 1, wherein the speed reduction or overdrive stage of the first drive device is an overdrive, which has a speed ratio in a range 1.1 and 2.

3. The range of motorized-drive devices according to claim 1, wherein the speed overdrive or reduction stage between the second geared motor unit and the winding tube is a speed reducer that has a speed ratio in a range between 1/1.1 and 1/2.

4. The range of motorized-drive devices according to claim 1, wherein the first geared motor unit directly drives the first shaft.

5. The range of motorized-drive devices according to claim 1, wherein the first geared motor unit shared by the range has a cylindrical casing.

6. The range of motorized-drive devices according to claim 1, wherein the first drive device includes a compensating spring mounted kinematically between the first shaft and the first support.

7. The range of motorized-drive devices according to claim 1, wherein the second drive device includes a compensating spring housed in the winding tube and mounted kinematically between the winding tube and the second support.

8. The range of motorized-drive devices according claim 1, wherein the shared geared motor unit model of the range comprises a rotary encoder and a rotation sensor reading information borne by the encoder.

9. The range of motorized-drive devices according to claim 1, wherein the first geared motor unit is powered by a first electrochemical source housed in the first support, and the second geared motor unit is powered by a second electrochemical source housed in the second support.

10. The range of motorized-drive devices according to claim 1, wherein the first electronic control module and the second electronic control module are physically identical and define an electronic control module shared by the drive devices in the range.

11. The range of motorized-drive devices according to claim 1, wherein:
the first electronic control module of the first geared motor unit is fastened to the first support remote from the first geared motor unit and connected to the first geared motor unit by a first flexible electrical connection; and
the second electronic control module of the second geared motor unit is fastened to the second support remote from the second geared motor unit and connected to the second geared motor unit by a second flexible electrical connection.

12. The range of motorized-drive devices according to claim 1, further comprising:
at least one third device for driving a third screening blind, including:
a third support,
a third shaft rotating around a third axis of revolution with respect to the third support,
at least a winding drum for winding a drive cord of the third screening blind, secured in rotation with the third shaft,
a third geared motor unit for driving the third shaft, housed in the third support and kinematically connected to the third shaft by a speed reducer, and
a third electronic control module of the third geared motor unit, the third geared motor unit being of the shared geared motor unit model of the range.

13. The range of motorized-drive devices according to claim 12, wherein:
the overdrive of the first driving device has a speed ratio in a range between 1.1 and 2; and
the speed reducer of the first driving device has a speed ratio in a range between 1/2 and 1/4.

14. The range of motorized-drive devices according to claim 3, wherein the second geared motor unit directly drives the winding tube of the second drive device.

15. The range of motorized-drive devices according to claim 3, wherein the first geared motor unit directly drives the first shaft.

16. The range of motorized-drive devices according to claim 2, wherein:
the overdrive of the first driving device has a speed ratio in a range between 1.1 and 2; and
the speed reducer of the first driving device has a speed ratio in a range between 1/2 and 1/4.

* * * * *